Aug. 30, 1927.

V. J. CHAPMAN 1,640,437

ELECTRIC WELDING

Filed Feb. 16, 1925   2 Sheets-Sheet 1

Inventor:
Verni J. Chapman.
by *Alexander S. [signature]*
His Attorney.

Aug. 30, 1927. 1,640,437
V. J. CHAPMAN
ELECTRIC WELDING
Filed Feb. 16, 1925 2 Sheets-Sheet 2

Inventor
Verni J. Chapman
by
His Attorney

Patented Aug. 30, 1927.

1,640,437

UNITED STATES PATENT OFFICE.

VERNI J. CHAPMAN, OF SCHENECTADY, NEW YORK, ASSIGNOR TO GENERAL ELECTRIC COMPANY, A CORPORATION OF NEW YORK.

ELECTRIC WELDING.

Application filed February 16, 1925. Serial No. 9,403.

My invention relates to arc welding machines wherein a backing member is arranged to be maintained in contact with the metal of the weld during the welding operation, and has for its principal object the provision of an improved backing member which may be readily forced into the irregularities of the work in a manner to prevent burning of the parts to be welded. A further object is the provision of an improved arrangement for stabilizing the welding arc.

In the electric welding of metal parts, the edges to be united are commonly placed in juxtaposition upon a backing member which may serve to support the work. With this arrangement, difficulty is frequently encountered due to the fact that the edges do not lie smoothly upon the backing member and the metal is burned or an unevenness in the thickness of the weld is produced at points where it is out of contact with the backing member. A further difficulty encountered in electric arc welding is unstableness of the welding arc. In accordance with my invention, burning of the metal is prevented by the provision of a flexible backing member adapted to be forced into the irregularities of the work, and the difficulty of stabilizing the arc is largely avoided by the production of a magnetic field which is utilized to prevent bowing or lateral displacement of the arc.

My invention will be better understood from the following description when considered in connection with the accompanying drawings and its scope will be pointed out in the appended claims.

Figure 1:
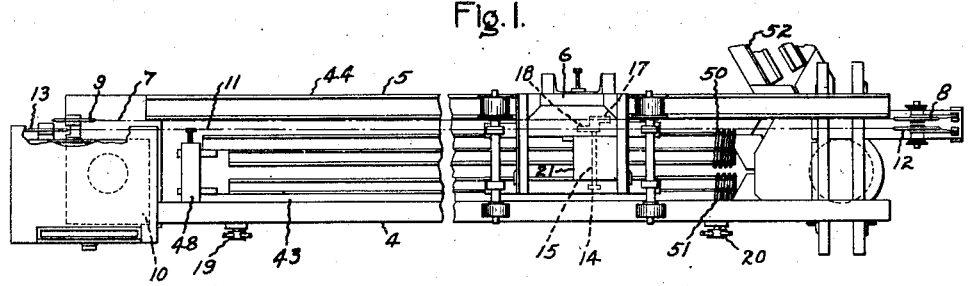
Figure 2:
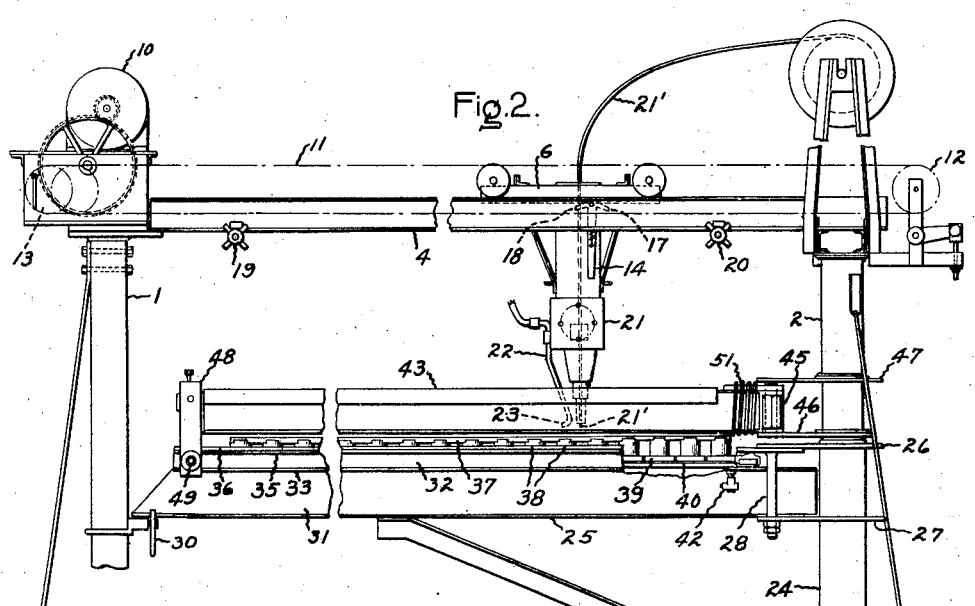
Figure 3:
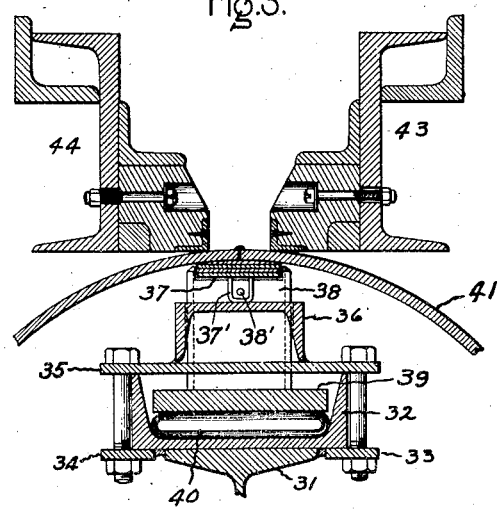
Figure 4:
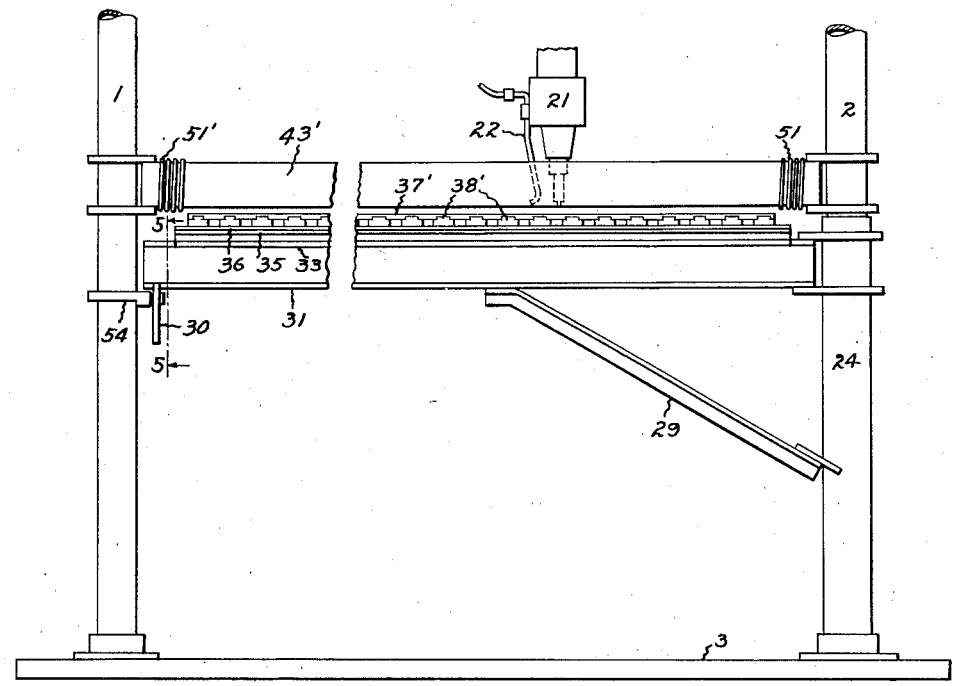
Figure 5:
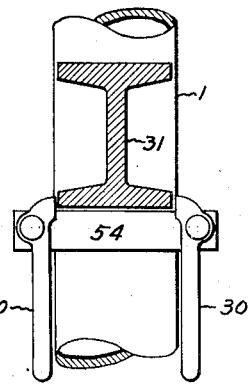
Figure 3A:
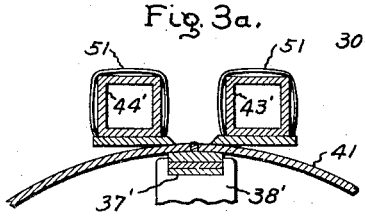

Referring to the drawings, Figs. 1 and 2 are different views of an arc welding machine in which my invention has been embodied; Fig. 3 is a sectional view of certain parts of the machine shown by Figs. 1 and 2; Fig. 3ª shows a modification of the parts shown by Fig. 3; Fig. 4 shows a machine which differs in certain details from that illustrated by the preceding figures; in Fig. 5 is a view taken on section 5—5 of Fig. 4.

Figs. 1, 2 and 3 show an arc welding machine comprising pillars 1 and 2 mounted on a base 3 and arranged to support members 4 and 5 which form a trackway for the welding head carriage 6. The carriage 6 is arranged to be driven along the trackway in one direction by means of a belt or sprocket chain 7, idle pulley 8, and a pulley 9 geared to the motor 10 in any suitable manner and to be driven in the opposite direction by means of a belt or sprocket chain 11, idle pulley 12 and a pulley 13 which is likewise geared to the motor 10. An operating lever 14 mounted on the shaft 15 is provided for connecting the carriage 6 either to the chain 7 or to the chain 11 by means of a lug 17 or a lug 18 respectively, and is adapted to be moved into its reverse or neutral position by means of adjustable stops 19 and 20 when the welding head 21 has reached the limits of its travel. A pipe 22 supported by the welding head 21 and provided with a nozzle 23 is arranged to create a current of air for dissipating the vapors tending to form a deposit of oxide around the nozzle through which the welding electrode 21' is fed from a reel shown as supported above the pillar 2.

It will be observed that the lower part of the pillar 2 is surrounded by a rotatable cylindrical member 24 to which a fabricated work support 25 is attached by means shown as members 26 and 27, pins 28 and brace 29. Catches 30 (shown more clearly in Fig. 5) are provided for locking the work support member in a position to permit welding of the work. The work support member may be of any suitable form. As shown in Fig. 3, it comprises a beam 31, a channel member 32, plate members 33, 34 and 35 and a channel member 36, the plate members 33 and 34 being welded to the channel member 32 and the channel member 36 being welded to the plate 35.

A backing member shown as comprising flexible plates 37, which may be made of copper, steel or other suitable material, is supported upon the upper ends of a series of movable, hollow, cylindrical members 38 which are arranged to extend through the plate 35 and channel 36 and are provided at their lower ends with shoulders 39 adapted to rest upon fluid pressure responsive means shown as a flexible hose 40. Fluid for distending the hose 40 to bring the backing member 37 into contact with the work 41 may be admitted through the pipe 42. It will be observed that the cylindrical members 38 may be moved independently of one another to force the plates 37 into the irregularities of the work in a manner to prevent burning of the metal. Projections 38' may be provided on the cylindrical members 38 for supporting the cylinders and work when the hose 40 is not distended and U-shaped members 37' may be provided to prevent working of the backing member 37.

In the case of heavy work, the weight of the work may be utilized to maintain the seam in contact with the backing plate; but when light work is to be welded, it is desirable that means be provided for holding the work against the pressure exerted through the backing plate. Holding members, shown in Figs. 1, 2 and 3 as fabricated cantilever beams 43 and 44 and in Fig. 3ª as rectangular beams 43' and 44', are provided for this purpose. These beams, shown as supported by a pin 45 mounted between the members 46 and 47, are arranged to be held in place by a yoke 48 pivoted to the channel member 32 at 49, and may be of any convenient form having sufficient strength and allowing proper disposition of the heat produced by the welding operation. Plate members 46 and 47 are attached to the pillar 2.

In the operation of automatic arc welding machines, it has been found that the arc tends to bow and wander about somewhat at different points along the seam. This unsteadiness or unstability of the arc seems to be the result of variations in the magnetic field surrounding the arc at different points along the seam. When operating machines of the type illustrated, this difficulty has been obviated to a large extent by the provision of coils 50 and 51 which are wound around beams 43 and 44 so that these beams form the opposite poles of a magnet.

In order to facilitate assembly of the work in the machine, an additional work support member 52 similar to the member 25 and angularly displaced therefrom may be mounted on the member 24, thus permitting the work to be placed upon its support while the machine is operating and to be immediately moved into alinement with the beams 43 and 44 upon the completion of a preceding welding operation.

The operation of the machine illustrated by Figs. 1, 2 and 3 will be readily understood without detailed explanation. Assuming the work support member 25 to be disengaged from and swung out of alinement with the beams 43 and 44, the work may be assembled for welding by placing it on the backing member 37, swinging the member 25 around into alinement with the beams 43 and 44, rotating the yoke 48 into engagement with the ends of the beams 43 and 44 and forcing the backing plate 37 into contact with the work by means of air admitted to the hose 40 through the pipe 42, thus clamping the work between the backing plate and beams in a manner to facilitate welding.

It will be readily understood that the work holder described herein may be modified in form to adapt it to work of different shapes and that it has utility when utilized in connection with either manual or automatic welding operations.

Fig. 4 is a fragmentary view of a welding machine wherein the cantilever beams 43 and 44 of the machine illustrated by the preceding figures are replaced by beams 43' and 44' supported at opposite ends by the pillars 1 and 2 and wherein additional coils 51' are provided for stabilizing the arc. The construction of the machine is otherwise substantially the same as that of the machine previously described and its operation will be readily understood without detailed explanation. As indicated by Fig. 5, the catches 30 are pivoted to a member 54 mounted on the pillar 1.

The embodiments of the invention illustrated and described herein have been selected for the purpose of clearly setting forth the principles involved. It will be apparent, however, that the invention is susceptible of being modified in many ways to meet the different conditions encountered in its use and I therefore aim to cover by the appended claims all modifications within the true spirit and scope of my invention.

What I claim as new and desire to secure by Letters Patent of the United States, is,—

1. An electric arc welding machine comprising a backing member adapted to contact with the metal of the weld, and a backing member support including a plurality of parts arranged to be moved independently of one another for forcing said backing member into the irregularities of the parts to be welded.

2. A welding apparatus comprising a backing member adapted to contact with the metal of the weld, and a flexible backing member support for forcing said backing member into the irregularities of the parts to be welded whereby burning of said parts is prevented.

3. A welding apparatus comprising a backing member adapted to contact with the metal of the weld, a backing member support including a plurality of parts arranged to be moved independently of one another for forcing said backing member into the irregularities of the parts to be welded, and fluid pressure means for controlling the movement of said parts.

4. An electric welding machine comprising a holding member, a flexible backing member adapted to contact with the parts to be welded, and means arranged to be operated by fluid pressure for forcing said parts into contact with said holding member and for forcing said backing member into the irregularities of said parts.

5. An arc welding apparatus comprising magnetizable holding members extending along the line of the seam to be welded, and means for magnetizing said holding members to produce a magnetic field directed across and extending along the line of the weld.

6. An electric arc welding machine comprising magnetizable holding members extending along the line of the seam to be welded, means adapted to clamp the work against said holding members, and means for magnetizing said holding members to produce a magnetic field directed across and extending along the line of the weld.

7. An electric arc welding machine comprising holding members extending along the line of the seam to be welded, a backing member adapted to contact with the parts to be welded, and means arranged to be operated by fluid pressure for forcing said backing member into contact with said parts to clamp said parts to said holding members.

8. An electric welding apparatus comprising a flexible backing member adapted to contact with the parts to be welded, and means comprising a distensible hose extending along the line of the weld for forcing said backing member against said parts.

9. A welding apparatus comprising a flexible backing member adapted to contact with the parts to be welded, a series of independently movable supports for said backing member, and fluid pressure responsive means for moving said supports to force said backing member into the irregularities of said parts.

In witness whereof, I have hereunto set my hand this 14th day of February, 1925.

VERNI J. CHAPMAN.